US010267984B2

(12) United States Patent
Endo et al.

(10) Patent No.: US 10,267,984 B2
(45) Date of Patent: Apr. 23, 2019

(54) OPTICAL FIBER (71) Applicant: FUJIKURA LTD., Tokyo (JP)

(72) Inventors: Sho Endo, Sakura (JP); Takayuki Kitamura, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/505,155

(22) PCT Filed: May 13, 2016

(86) PCT No.: PCT/JP2016/064318
§ 371 (c)(1),
(2) Date: Feb. 20, 2017

(87) PCT Pub. No.: WO2017/013929
PCT Pub. Date: Jan. 26, 2017

(65) Prior Publication Data
US 2017/0269294 A1 Sep. 21, 2017

(30) Foreign Application Priority Data
Jul. 17, 2015 (JP) .................................. 2015-142741

(51) Int. Cl.
*G02B 6/36* (2006.01)
*G02B 6/036* (2006.01)
(Continued)

(52) U.S. Cl.
CPC ........... *G02B 6/036* (2013.01); *G02B 6/0283* (2013.01); *G02B 6/0285* (2013.01);
(Continued)

(58) Field of Classification Search
CPC ... G02B 6/036; G02B 6/02395; G02B 6/0283
See application file for complete search history.

(56) References Cited

U.S. PATENT DOCUMENTS

| 5,278,931 A | 1/1994 | Antos et al. |
| 5,729,645 A | 3/1998 | Garito et al. |

(Continued)

FOREIGN PATENT DOCUMENTS

| CN | 103048732 A | 4/2013 |
| CN | 103842306 A | 6/2014 |

(Continued)

OTHER PUBLICATIONS

"Transmission Systems and Media, Digital Systems and Networks", International Telecommunication Union, ITU-T G.652, Telecommunication Standardization Sector of ITU, 2016, cited in Specification (23 pages).

(Continued)

*Primary Examiner* — Ellen Kim
(74) *Attorney, Agent, or Firm* — Westerman, Hattori, Daniels & Adrian, LLP (57) ABSTRACT The refractive index of the inner core part 11 in a region in contact with the boundary of the outer core part 12 is higher than the refractive index of the outer core part 12. The refractive index of the outer core part 12 is gradually decreased from the inner circumferential side to the outer circumferential side. The refractive index of the inner cladding part 21 is equal to the refractive index of the outermost circumferential part of the outer core part 12 and not greater than the refractive index of the outer cladding part 22.

8 Claims, 9 Drawing Sheets (51) Int. Cl.
*G02B 6/02* (2006.01)
*G02B 6/028* (2006.01)

(52) U.S. Cl.
CPC ....... *G02B 6/02395* (2013.01); *G02B 6/0365* (2013.01); *G02B 6/03627* (2013.01)

(56) References Cited

U.S. PATENT DOCUMENTS

| | | | |
|---|---|---|---|
| 6,272,268 | B1 | 8/2001 | Miller et al. |
| 6,658,190 | B2 * | 12/2003 | Hirano ............... G02B 6/02019 385/123 |
| 7,876,990 | B1 | 1/2011 | Mishra |
| 8,787,719 | B2 * | 7/2014 | Lee .................. C03B 37/01413 385/123 |
| 9,481,599 | B2 * | 11/2016 | Bickham ............... G02B 6/0288 |
| 2002/0186942 | A1 | 12/2002 | Bubnov et al. |
| 2003/0035638 | A1 | 2/2003 | Mozdy et al. |
| 2004/0067034 | A1 | 4/2004 | Rosenblum et al. |
| 2005/0286848 | A1 | 12/2005 | Jakobsen et al. |
| 2006/0093297 | A1 | 5/2006 | Sako et al. |
| 2007/0204657 | A1 | 9/2007 | Barish et al. |
| 2010/0158460 | A1 | 6/2010 | Yoon et al. |
| 2012/0189258 | A1 | 7/2012 | Overton et al. |
| 2013/0094824 | A1 | 4/2013 | Lee et al. |
| 2013/0230290 | A1 | 9/2013 | Evans et al. |
| 2014/0161406 | A1 | 6/2014 | Kumano |
| 2015/0063754 | A1 | 3/2015 | Li et al. |

FOREIGN PATENT DOCUMENTS

| | | |
|---|---|---|
| DE | 41 27 868 A1 | 2/1993 |
| EP | 2 330 447 A1 | 6/2011 |
| JP | 52-64941 A | 5/1977 |
| JP | H06-235839 A | 8/1994 |
| JP | 2001-508554 A | 6/2001 |
| JP | 2004-537851 A | 12/2004 |
| JP | 2005-181414 A | 7/2005 |
| JP | 2005-534963 A | 11/2005 |
| JP | 4247997 B2 | 4/2009 |
| JP | 4268115 B2 | 5/2009 |
| JP | 2011-107672 A | 6/2011 |
| JP | 2012-133388 A | 7/2012 |
| JP | 2013-35722 A | 2/2013 |
| JP | 2013-512463 A | 4/2013 |
| JP | 2013-88818 A | 5/2013 |
| WO | 98/29768 A1 | 7/1998 |
| WO | 03/012489 A2 | 2/2003 |

OTHER PUBLICATIONS

International Search Report dated Aug. 16, 2016, issued in counterpart International Application No. PCT/JP2016/064318, w/English translation (2 pages).
Extended (supplementary) European Search Report dated Feb. 16, 2018 issued in counterpart application No. 16827493.4. (8 pages).
Decision on Opposition dated Feb. 14, 2019, issued in JP6321589 B2, with partial English translation. (67 pages).
Notification of Opposition dated Dec. 12, 2018, issued in JP6321589 B2. (1 pages).
Notice of Patent Opposition dated Nov. 9, 2018, issued in JP6321589 B2, with English translation, cited in Notification of Opposition dated Dec. 12, 2018. (99 pages).
Office Action dated Dec. 27, 2018, issued in counterpart Chinese application No. 201680002311.9, with English translation. (12 pages).

* cited by examiner

OPTICAL FIBER

TECHNICAL FIELD

The present invention relates to an optical fiber, which is preferred in the case of reducing bending losses.

BACKGROUND ART

Optical fibers used for optical communications are installed in offices, homes, and the like, or are used in optical fiber cables, in which a plurality of optical fibers is disposed in a sheath. In the case in which optical fibers are installed as described above, the optical fibers are typically disposed with at least a part of them being bent. In the case in which optical fibers are used in optical fiber cables as described above, the optical fibers are disposed being bent in the overall structure, because the optical fibers are typically spirally disposed in the sheath.

It is known that when light is propagated through a core of a bent optical fiber, a so-called bending loss occurs, in which light is leaked from the core to cause optical losses. As one example of optical fibers that reduce such bending losses, an optical fiber is known, in which the relative refractive index difference between a core and a cladding is increased. Patent Literature 1 below describes such an optical fiber. With such an optical fiber, the optical confinement power of the core is increased, and hence light is not easily leaked from the core, compared with the case in which the relative refractive index difference between the core and the cladding is small, allowing bending losses to be reduced as well. As another example of optical fibers that reduce bending losses, an optical fiber is known, in which a low-refractive index layer whose refractive index is lower than the refractive index of the cladding is provided around the core. Patent Literature 2 below describes such an optical fiber. This optical fiber is sometimes referred to as a trench optical fiber, because the low-refractive index layer is in a trench shape from the viewpoint of the refractive index. With such an optical fiber, light is not easily leaked from the core, because the low-refractive index layer confines light, allowing bending losses to be reduced as well.

[Patent Literature 1] Japanese Patent No. 4268115
[Patent Literature 2] JP2013-88818 A

SUMMARY OF INVENTION

In the optical fiber described in Patent Literature 1 described above, the mode field diameter of light tends to decrease, because the optical confinement power of the core is great. In this case, optical losses are easily caused, when the optical fiber is connected to another optical fiber. According to the optical fiber described in Patent Literature 2 described above, the optical fiber can prevent the mode field diameter of light from being decreased unlike the optical fiber described in Patent Literature 1. However, since a trench layer has to be provided on the optical fiber described in Patent Literature 2, there is concern that the configuration of the optical fiber is complicated to increase costs.

Therefore, an object of the present invention is to provide an optical fiber that can reduce a decrease in the mode field diameter of light, avoid a complicated configuration, and reduce bending losses.

To achieve the above object, an optical fiber of the present invention includes: a core; and a cladding surrounding the core, wherein the core includes an inner core part including a center axis of the core and having a refractive index that is constant in a radial direction, and an outer core part surrounding the inner core part, the cladding includes an inner cladding part having a refractive index that is constant in the radial direction, the inner cladding part being in contact with the core, and an outer cladding part surrounding the inner cladding part, a refractive index of a region of the inner core part in contact with the outer core part is higher than a refractive index of the outer core part, the refractive index of the outer core part is gradually decreased from an inner circumferential side to an outer circumferential side, and a refractive index of the inner cladding part is equal to a refractive index of an outermost circumferential part of the outer core part and is not greater than a refractive index of the outer cladding part.

The present inventors confirmed that, with such an optical fiber, bending losses can be reduced with no increase in the refractive index of the core unlike the optical fiber described in Patent Literature 1. The refractive index of the inner cladding part, which is equal to the refractive index of the outermost circumferential part of the outer core part, is constant, and no trench layer has to be provided unlike the optical fiber described in Patent Literature 2. Thus, a complicated configuration can be avoided.

Further, it is preferable that the refractive index of the inner cladding part is smaller than the refractive index of the outer cladding part. With the optical fiber in such a configuration, bending losses can be further reduced, compared with the case in which the refractive index of the inner cladding part is equal to the refractive index of the outer cladding part.

In this case, a relative refractive index difference of the inner cladding part to the outer cladding part may be −0.02% or more. The relative refractive index difference of the inner cladding part is set in this range. Thus, the zero dispersion wavelength of the optical fiber can be in a range of 1.300 to 1.324 μm, which is recommended by ITU-T G.652.

Alternatively, it is also preferable that the refractive index of the inner cladding part is equal to the refractive index of the outer cladding part. In this case, the composition of the inner cladding part can be made similar to the composition of the outer cladding part. Thus, a simple configuration can be provided.

Further, in the above optical fiber, it is preferable that when a distance from the center axis to an internal circumference of the outer core part is defined as $r_1$, a distance from the center axis to an outer circumference of the outer core part is defined as $r_s$, a relative refractive index difference of the outer core part to the outer cladding part at the distance $r$ from the center axis is defined as $\Delta(r)$, and the relative refractive index difference of the inner cladding part to the outer cladding part is defined as $\Delta_2$, S, which is expressed by the following Equation (1), is 0.3 or less.

$$S = \int_{r_1}^{r_s} (\Delta(r) - \Delta_2) dr \qquad (1)$$

The present inventors found that S in this equation is 0.3 or less, and hence the cutoff wavelength can be made smaller than 1.30 μm. Thus, Equation (1) is satisfied, and hence a narrower communication band can be avoided, which is caused by an increase in the cutoff wavelength.

Further, it is preferable that the S is 0.25 or less. By satisfying this condition, the cable cutoff wavelength can be 1.26 μm or less, and the mode field diameter can be 9.5 μm or less.

As described above, according to the present invention, there is provided an optical fiber that can reduce a decrease in the mode field diameter of light, avoid a complicated configuration, and reduce bending losses.

DESCRIPTION OF EMBODIMENTS

In the following, preferred embodiments of an optical fiber according to the present invention will be described in detail with reference to the drawings.

First Embodiment

Figure 1:
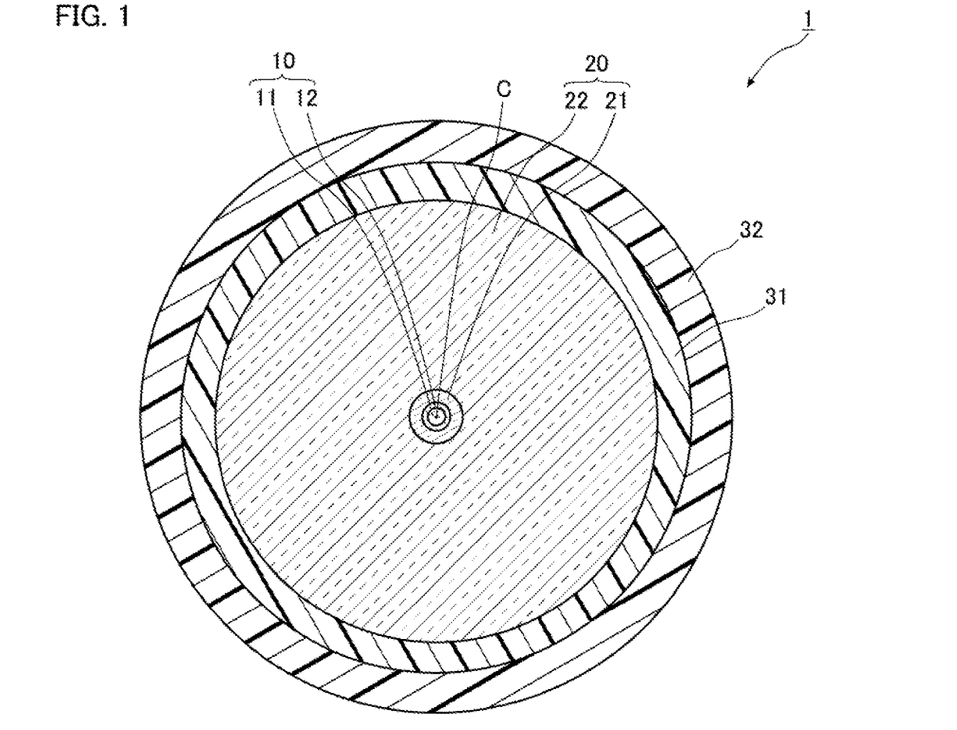
FIG. 1 is a diagram of the cross sectional structure of an optical fiber according to a first embodiment of the present invention perpendicular to the longitudinal direction.

FIG. 1 is a diagram of the cross sectional structure of an optical fiber according to a first embodiment perpendicular to the longitudinal direction.

As illustrated in FIG. 1, an optical fiber 1 according to the embodiment includes a core 10, a cladding 20 surrounding the outer circumferential surface of the core 10 with no gap, an inner protective layer 31 covering the outer circumferential surface of the cladding 20, and an outer protective layer 32 covering the outer circumferential surface of the inner protective layer.

The core 10 is formed of an inner core part 11 including a center axis C of the core 10 and an outer core part 12 surrounding the outer circumferential surface of the inner core part 11 with no gap. The cladding 20 is formed of an inner cladding part 21 surrounding the outer core part 12 of the core 10 with no gap and an outer cladding part 22 surrounding the inner cladding part 21 with no gap.

Figure 2:
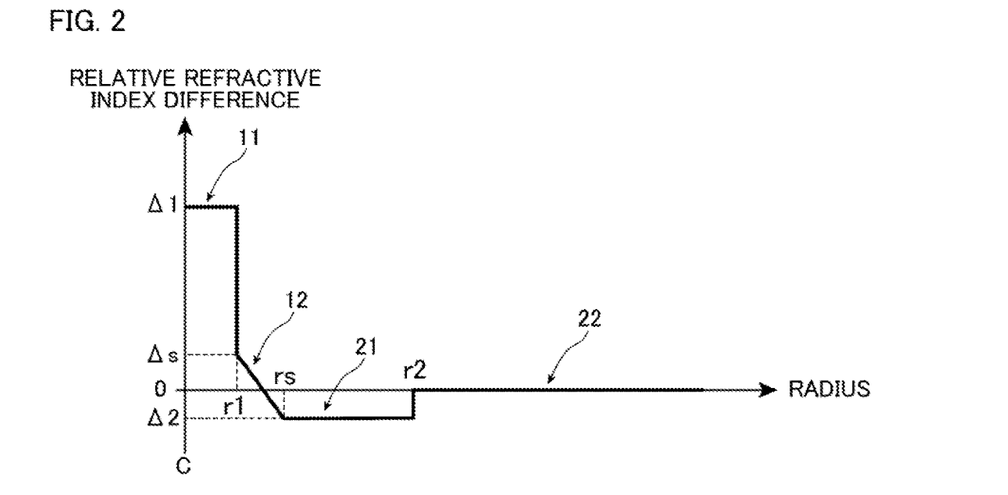
FIG. 2 is a diagram of the refractive index profile of the optical fiber in FIG. 1.

FIG. 2 is a diagram of the refractive index profiles of the core 10 and the cladding 20 of the optical fiber 1. Note that, in FIG. 2, a portion expressing the relative refractive index difference of the inner core part 11 in FIG. 1 is denoted as 11. A portion expressing the relative refractive index difference of the outer core part 12 is denoted as 12. A portion expressing the relative refractive index difference of the inner cladding part 21 is denoted as 21. A portion expressing the relative refractive index difference of the outer cladding part 22 is denoted as 22. As illustrated in FIG. 2, the inner core part 11 has a step refractive index profile. The refractive index of the inner core part 11 is constant in the radial direction. The refractive index of the outer core part 12 is gradually decreased from the inner circumferential side to the outer circumferential side. The refractive index of a region of the inner core part 11 in contact with the outer core part 12 is higher than the refractive index of a region of the outer core part 12 in contact with the inner core part 11. Thus, the refractive index of the inner core part 11 is generally higher than the refractive index of the outer core part 12.

The refractive indexes of the inner cladding part 21 and the outer cladding part 22 are constant in the radial direction. In the embodiment, the refractive index of the inner cladding part 21 is lower than the refractive index of the outer cladding part 22, and equal to the refractive index of the outermost circumferential part of the outer core part 12.

Here, as illustrated in FIG. 2, a distance from the center axis C to the internal circumference of the outer core part 12 (a distance from the center axis C to the outer circumference of the inner core part 11) is defined as r1. A distance from the center axis C to the outer circumference of the outer core part 12 (a distance from the center axis C to the internal circumference of the inner cladding part 21) is defined as rs. A distance from the center axis C to the outer circumference of the inner cladding part 21 (a distance from the center axis C to the internal circumference of the outer cladding part 22) is defined as r2. The relative refractive index difference of the inner core part 11 to the outer cladding part 22 is defined as Δ1. The relative refractive index difference of the region of the outer core part 12 in contact with the inner core part 11 to the outer cladding part 22 is defined as Δs. The relative refractive index difference of the region of the outer core part 12 in contact with the inner cladding part 21 to the outer cladding part 22 is defined as Δ2. Note that, in this case, the relative refractive index difference of the inner cladding part 21 to the outer cladding part 22 is also defined as Δ2.

The relative refractive index difference Δ1 of the inner core part 11 is 0.3% or more and 0.5% or less, for example. The relative refractive index difference Δs of the region of the outer core part 12 in contact with the inner core part 11 is 0.02% or more and 0.12% or less, for example. The relative refractive index difference Δ2 of the region of the outer core part 12 in contact with the inner cladding part 21 is smaller than 0%, which is −0.02% or more, for example.

Materials configuring the core 10 and the cladding 20 of the optical fiber 1 having such refractive index profiles are not limited specifically. The materials are configured below, for example. Specifically, the outer cladding part 22 is formed of pure silica. The inner cladding part 21 is formed of silica appropriately doped with a dopant, such as fluorine (F), which decreases the refractive index. The inner core part 11 is formed of silica doped with a dopant, such as germanium (Ge), which increases the refractive index. The outer core part 12 is formed of silica appropriately doped with a dopant that increases the refractive index and a dopant that decreases the refractive index, in which the amounts of these dopants are changed so as to decrease the refractive index along the radial direction.

Next, in the optical fiber 1, simulation below is performed using the values above. In this simulation, the relative refractive index difference Δ1 of the inner core part 11 was 0.35%, the radius r1 of the inner core part 11 was 4.2 μm, and the relative refractive index difference Δ2 of the region of the outer core part 12 in contact with the inner cladding part 21 was −0.02%. Note that, the value of the relative refractive index difference Δ1 is similar to the value of the relative refractive index difference of the core of a typical communication optical fiber having a step refractive index profile.

Figure 3:
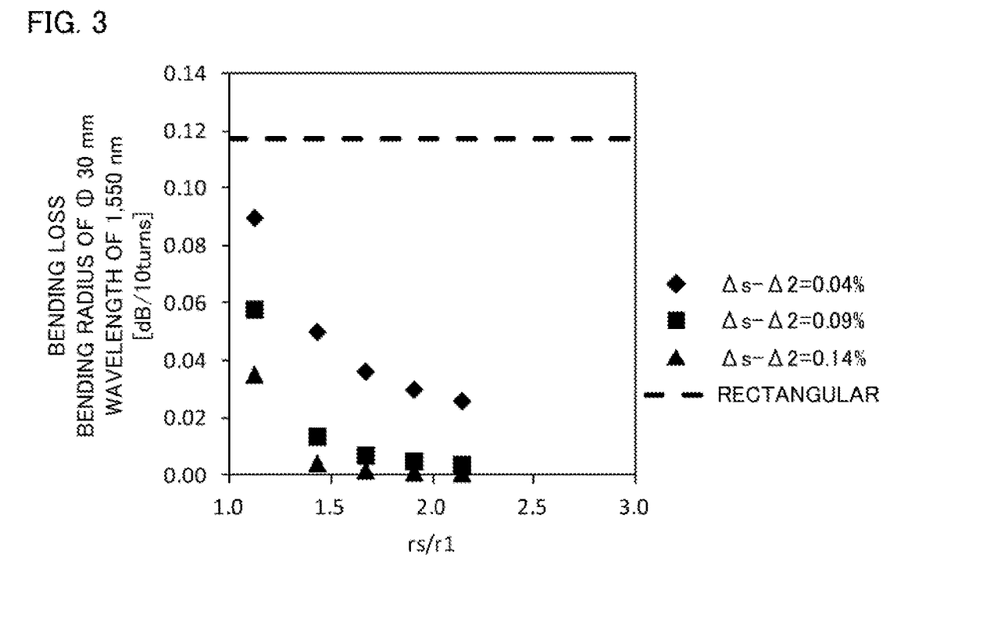
FIG. 3 is a diagram of the relationship between the ratio of an inner diameter to an outer diameter in an outer core part and bending losses at a bending diameter of 30 mm in the case in which light at a wavelength of 1,550 nm is propagated through the optical fiber in FIG. 1.
Figure 4:
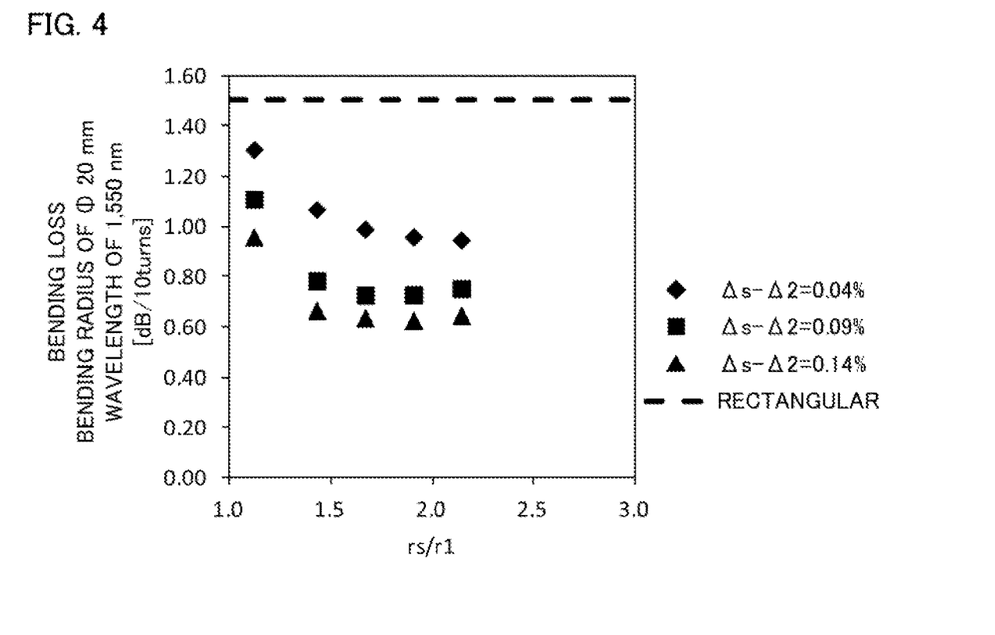
FIG. 4 is a diagram of the relationship between the ratio of the inner diameter to the outer diameter in the outer core part and bending losses at a bending diameter of 20 mm in the case in which light at a wavelength of 1,550 nm is propagated through the optical fiber in FIG. 1.

FIGS. 3 and 4 are diagrams of the relationship between the ratio rs/r1 of the optical fiber 1 and bending losses. In FIG. 3, the bending diameter of the optical fiber 1 was 30 mm. In FIG. 4, the bending diameter of the optical fiber 1 was 20 mm. In FIGS. 3 and 4, it was supposed that light at a wavelength of 1,550 nm is to be propagated through the core 10. In FIGS. 3 and 4, a broken line expresses the bending loss of an optical fiber with no outer core part 12. In this case, since the refractive index profile is a rectangular profile, the word "rectangular" is written in FIGS. 3 and 4. As illustrated in FIGS. 3 and 4, it is revealed that bending losses are deceased because the outer core part 12 is provided. It is revealed that bending losses are decreased as the ratio rs/r1 is more increased, i.e. as the outer diameter of the outer core part 12 is more increased. It is revealed that bending losses are decreased as the value of Δs−Δ2 is more increased. FIG. 4 reveals that when the bending diameter is 20 mm, bending losses are not changed so much in the region in which the ratio rs/r1 is about 1.7 or more, regardless of the value of Δs−Δ2.

Here, from the width of the outer core part 12 and the relative refractive index difference to the outer cladding part 22, a relative refractive index difference area S of the outer core part 12 can be defined. Specifically, when the distance from, the center axis C of the core 10 is defined as r and the relative refractive index difference of the outer core part 12 to the outer cladding part 22 in the region at the distance r from the center axis C is defined as Δ(r), the relative refractive index difference area S can be expressed as Equation (1) below.

$$S = \int_{r1}^{rs} (\Delta(r) - \Delta 2) dr \quad (1)$$

Figure 5:
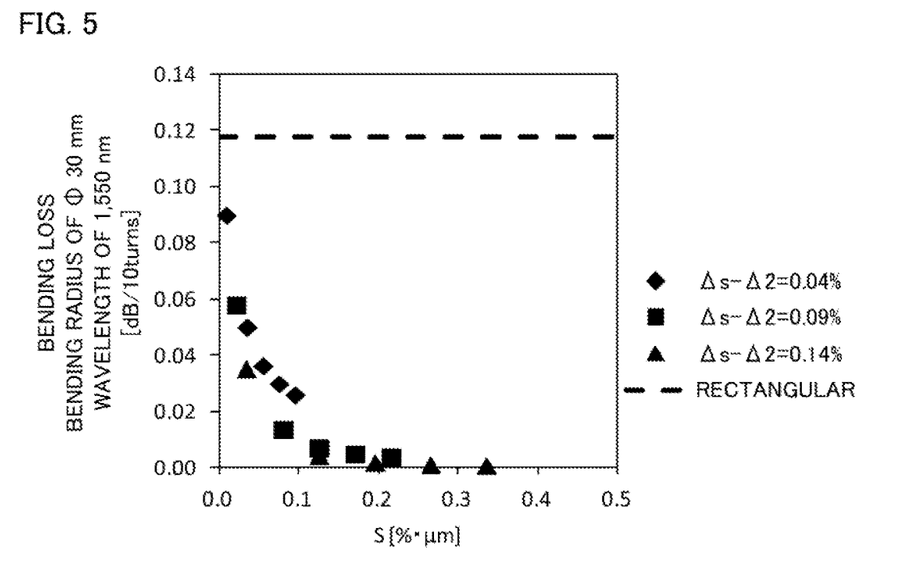
FIG. 5 is a diagram of the relationship between the relative refractive index difference area of the outer core part and bending losses at a bending diameter of 30 mm in the case in which light at a wavelength of 1,550 nm is propagated through the optical fiber in FIG. 1.
Figure 6:
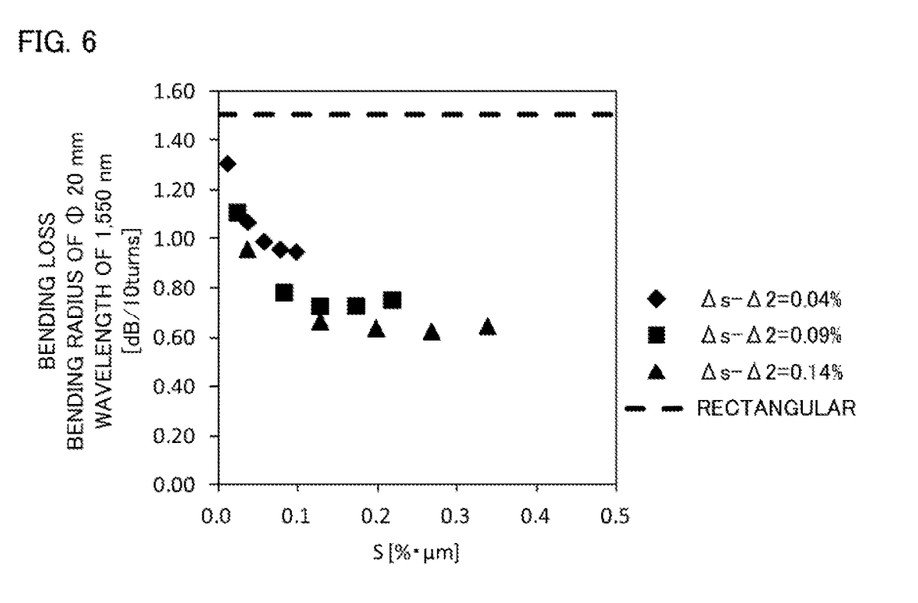
FIG. 6 is a diagram of the relationship between the relative refractive index difference area of the outer core part and bending losses at a bending diameter of 20 mm in the case in which light at a wavelength of 1,550 nm is propagated through the optical fiber in FIG. 1.

FIGS. 5 and 6 are diagrams of the relationship between the relative refractive index difference area S and bending losses. In FIG. 5, the bending diameter of the optical fiber 1 was 30 mm. In FIG. 6, the bending diameter of the optical fiber 1 was 20 mm. In FIGS. 5 and 6, it was supposed that light at a wavelength of 1,550 nm is to be propagated through the core 10. Note that, similarly to the broken line in FIGS. 3 and 4, in FIGS. 5 and 6, a broken line expresses the bending loss of an optical fiber with no outer core part 12, and the word "rectangular" is written in FIGS. 5 and 6. As illustrated in FIGS. 5 and 6, it is revealed that bending losses are decreased as the value of the relative refractive index difference area S is more increased. In the optical fiber 1 according to the embodiment, when the relative refractive index difference area S is 0.1% μm or more, bending losses can be generally at the minimum.

Figure 7:
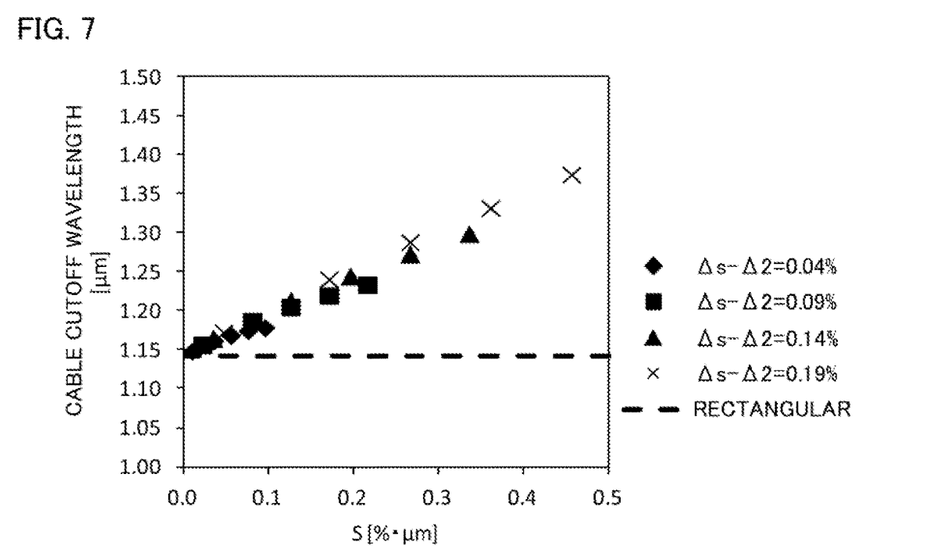
FIG. 7 is a diagram of the relationship between the relative refractive index difference area of the outer core part of the optical fiber in FIG. 1 and cable cutoff wavelengths.

FIG. 7 is a diagram of the relationship between the relative refractive index difference area S and cable cutoff wavelengths. In FIG. 7, a broken line expresses the cable cutoff wavelength of an optical fiber with no outer core part 12, and the word "rectangular" is written in FIG. 7. As illustrated in FIG. 7, in the optical fiber 1 according to the embodiment, when the relative refractive index difference area S is 0.3% μm or less, the cable cutoff wavelength can be made smaller than a wavelength of 1.30 μm, and when the relative refractive index difference area S is 0.25% μm or less, the cable cutoff wavelength can be 1.26 μm or less. Note that, in ITU-T G.652, it is recommended that the cable cutoff wavelength is 1.26 μm or less. Thus, when the relative refractive index difference area S is 0.25% μm or less, this recommendation can be satisfied.

Figure 8:
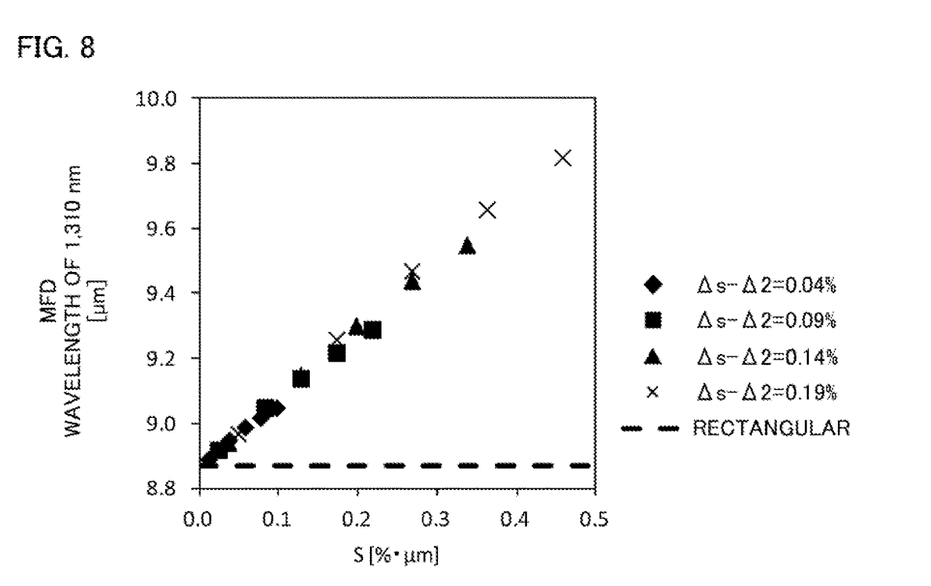
FIG. 8 is a diagram of the relationship between the relative refractive index difference area of the outer core part of the optical fiber in FIG. 1 and the mode field diameter of light at a wavelength of 1,310 nm.

FIG. 8 is a diagram of the relationship between the relative refractive index difference area S and the mode field diameter of light at a wavelength of 1,310 nm. In FIG. 8, a broken line expresses the mode field diameter of an optical fiber with no outer core part 12, and the word "rectangular" is written in FIG. 8. As illustrated in FIG. 8, with the optical fiber 1 of the embodiment, a decrease in the mode field diameter of light can be reduced, compared with the mode field diameter of light at a wavelength of 1,310 nm propagated through a typical communication optical fiber having a step refractive index profile. When the relative refractive index difference area S is 0.31% μm or less, the mode field diameter of light at a wavelength of 1,310 nm can be generally 9.5 μm or less. Note that, in ITU-T G.652, it is recommended that the mode field diameter of light at a wavelength of 1,310 nm is in a range of 8.6 to 9.5 μm. When the relative refractive index difference area S is 0.3% μm or less, this recommendation can be satisfied.

Figure 9:
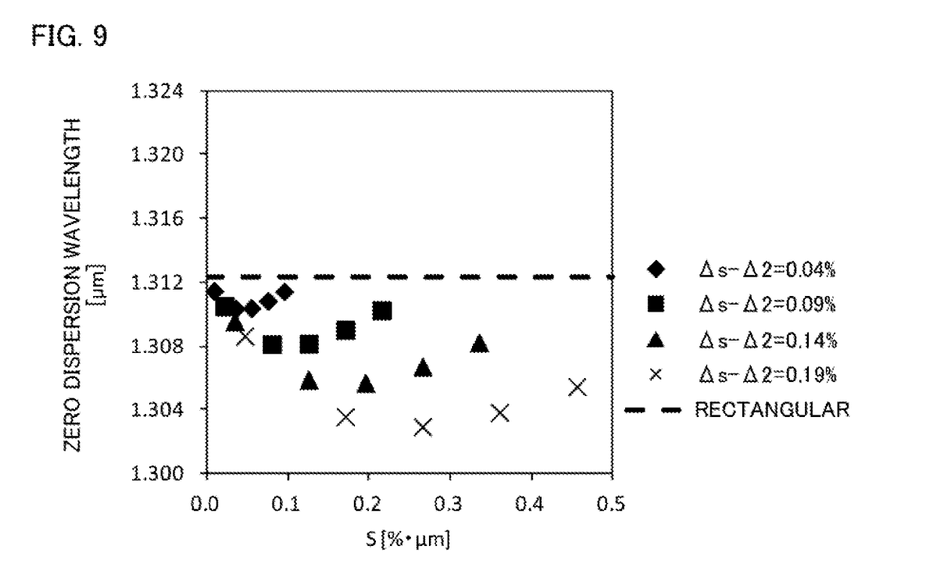
FIG. 9 is a diagram of the relationship between the relative refractive index difference area of the outer core part of the optical fiber in FIG. 1 and the zero dispersion wavelength.

FIG. 9 is a diagram of the relationship between the relative refractive index difference area of the outer core part of the optical fiber in FIG. 1 and the zero dispersion wavelength. In FIG. 9, a broken line expresses the zero dispersion wavelength of an optical fiber with no outer core part 12, and the word "rectangular" is written in FIG. 9. As illustrated in FIG. 9, it is revealed that the zero dispersion wavelength is decreased because the outer core part 12 is provided. It is revealed that the zero dispersion wavelength is decreased as the value of Δs−Δ2 is more increased, and that the relative refractive index difference area S is present in which the zero dispersion wavelength is most decreased for each of the values of Δs−Δ2. As described above, in the case in which the relative refractive index difference Δ2 is −0.02%, the zero dispersion wavelength of the optical fiber can be in a range of 1.300 to 1.324 μm, which is recommended in ITU-T G.652.

As described above, with the optical fiber 1 of the embodiment, by providing the outer core part 12 as described above, bending losses can be reduced with no increase in the refractive index of the core. The refractive index of the inner cladding part 21, which is equal to the refractive index of the outermost circumferential part of the outer core part 12, is constant, and the trench layer whose refractive index is much lower than the refractive index of the inner cladding part 21 is not provided. Thus, a complicated configuration can be avoided.

Second Embodiment

Next, a second embodiment of the optical fiber according to the present invention will be described in detail with reference to FIGS. 10 to 17. Note that, components same as or equivalent to ones of the optical fiber 1 of the first embodiment are designated the same reference numerals and signs, and the overlapping description is omitted, unless otherwise specified.

Figure 10:
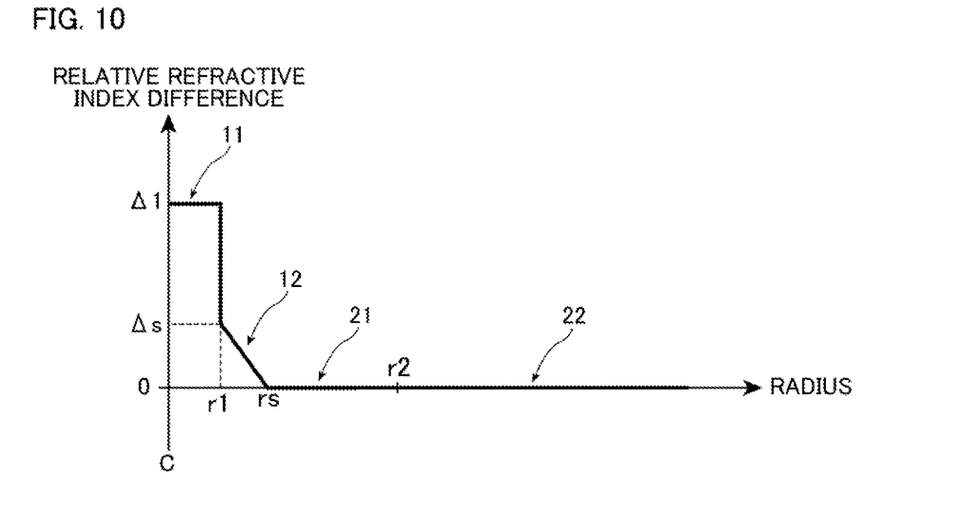
FIG. 10 is a diagram of the refractive index profile of an optical fiber according to a second embodiment.

FIG. 10 is a diagram of the refractive index profiles of a core 10 and a cladding 20 of an optical fiber according to the embodiment similarly to FIG. 2. As illustrated in FIG. 10, the optical fiber according to the second embodiment is different from the optical fiber 1 according to the first embodiment in that the refractive index of an inner cladding part 21 is equal to the refractive index of an outer cladding part 22.

Here, in the optical fiber according to the embodiment, simulation below is performed. In this simulation, the relative refractive index difference Δ1 of an inner core part 11 was 0.34%, and the radius r1 of the inner core part 11 was 4.1 μm. Note that, the relative refractive index difference Δ2 of the region of an outer core part 12 in contact with the inner cladding part 21 is −0%, because it is the same as the relative refractive index difference of the inner cladding part 21.

Figure 11:
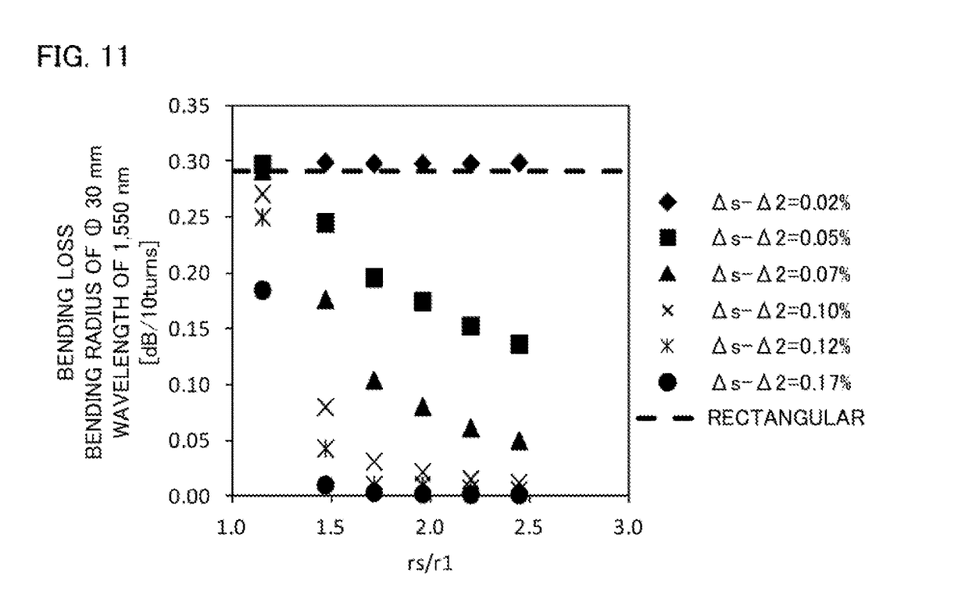
FIG. 11 is a diagram of the relationship between the ratio of an inner diameter to an outer diameter in an outer core part and bending losses at a bending diameter of 30 mm in the case in which light at a wavelength of 1,550 nm is propagated through the optical fiber described in FIG. 10.
Figure 12:
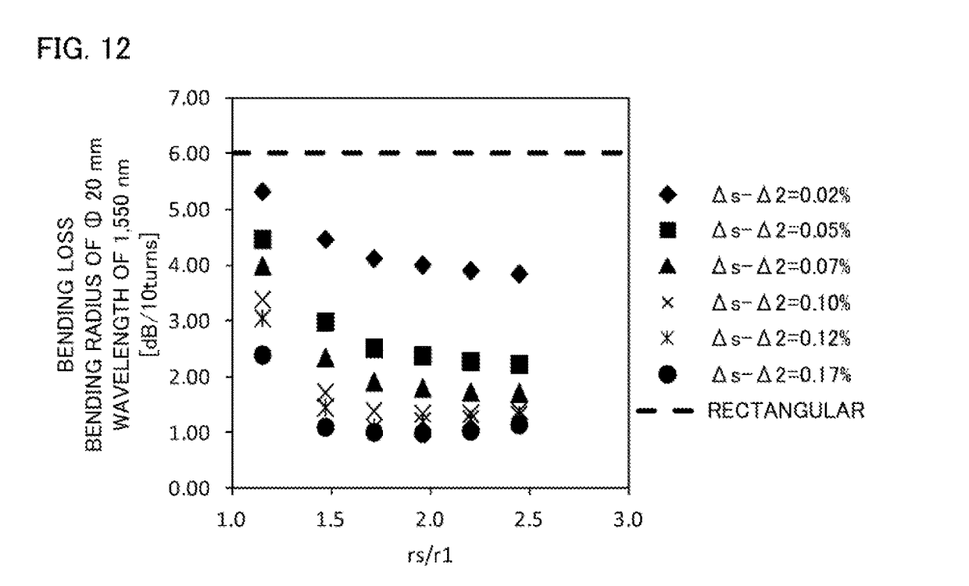
FIG. 12 is a diagram of the relationship between the ratio of the inner diameter to the outer diameter in the outer core part and bending losses at a bending diameter of 20 mm in the case in which light at a wavelength of 1,550 nm is propagated through the optical fiber described in FIG. 10.

FIGS. 11 and 12 are diagrams of the relationship between the ratio rs/r1 of the optical fiber according to the embodiment and bending losses shown in the same manner as in FIGS. 3 and 4 of the first embodiment. In FIG. 11, the bending diameter of the optical fiber was 30 mm. In FIG. 12, the bending diameter of the optical fiber was 20 mm. It was supposed that light at a wavelength of 1,550 nm is to be propagated through the core 10 in FIGS. 11 and 12. As illustrated in FIGS. 11 and 12, also in the optical fiber according to the embodiment, it is revealed that bending losses are decreased because the outer core part 12 is provided. Note that, in FIG. 11, data of Δs−Δ2=0.002% is located on the upper side of a broken line. This is considered to be an error in calculation. It can be thought that the data is originally located on the lower side of the broken line. It is revealed that bending losses are decreased as the ratio rs/r1 is more increased. It is revealed that bending losses are decreased as the value of Δs−Δ2 is more increased. FIG. 12 reveals that when the bending diameter is 20 mm, bending losses are not changed so much in the region in which the ratio rs/r1 is about 1.7 or more, regardless of the value of Δs−Δ2.

Figure 13:
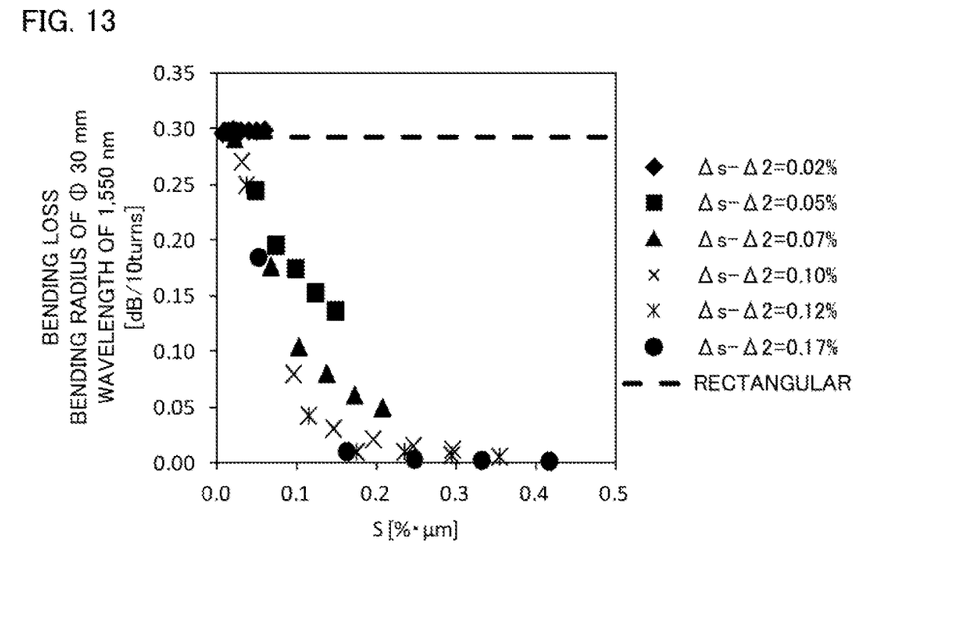
FIG. 13 is a diagram of the relationship between the relative refractive index difference area of the outer core part and bending losses at a bending diameter of 30 mm in the case in which light at a wavelength of 1,550 nm is propagated through the optical fiber described in FIG. 10.
Figure 14:
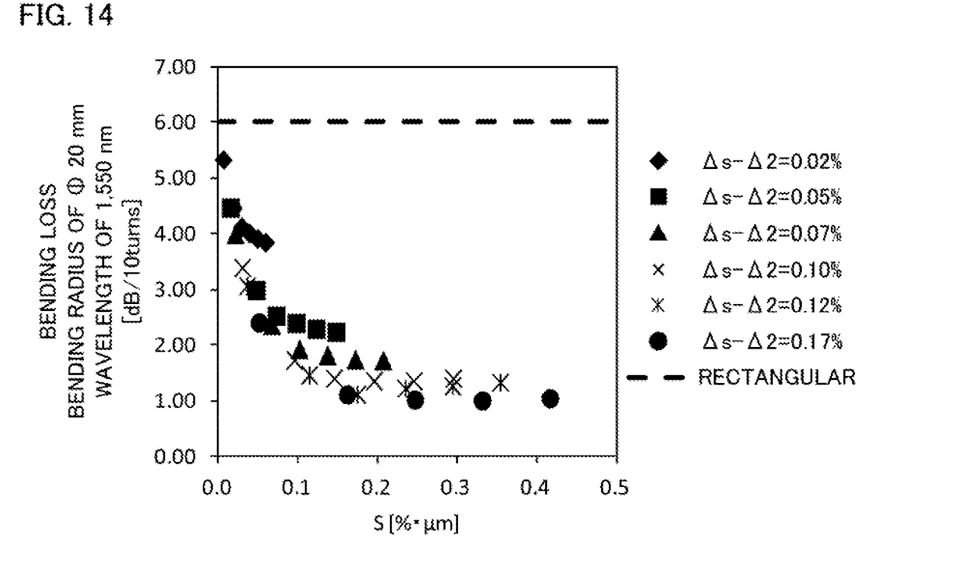
FIG. 14 is a diagram of the relationship between the relative refractive index difference area of the outer core part and bending losses at a bending diameter of 20 mm in the case in which light at a wavelength of 1,550 nm is propagated through the optical fiber described in FIG. 10.

FIGS. 13 and 14 are diagrams of the relationship between the relative refractive index difference area S and bending losses shown in the same manner as in FIGS. 5 and 6. In FIG. 13, the bending diameter of the optical fiber 1 was 30 mm. In FIG. 14, the bending diameter of the optical fiber 1 was 20 mm. It was supposed that light at a wavelength of 1,550 nm is to be propagated through the core 10 in FIGS. 13 and 14. As illustrated in FIGS. 13 and 14, it is revealed that bending losses are decreased as the value of the relative refractive index difference area S is more increased. Note that, in FIG. 13, data of Δs−Δ2=0.002% is located on the upper side of a broken line. This is considered to be an error in calculation. It can be thought that the data is originally located on the lower side of the broken line. In the optical fiber according to the embodiment, in the case in which the bending diameter is 20 mm, bending losses can be generally at the minimum when the relative refractive index difference area S is 0.1% μm or more. From FIGS. 5 and 6 of the first embodiment and FIG. 14 of the second embodiment, it is revealed that when the relative refractive index difference area S is 0.1% μm or more, bending losses can be often generally at the minimum.

Note that, it is apparent from FIGS. 3 to 6 of the first embodiment and FIGS. 11 to 14, from the viewpoint of allowing a decrease in bending losses, the refractive index of the inner cladding part 21 is preferably smaller than the refractive index of the outer cladding part 22.

Figure 15:
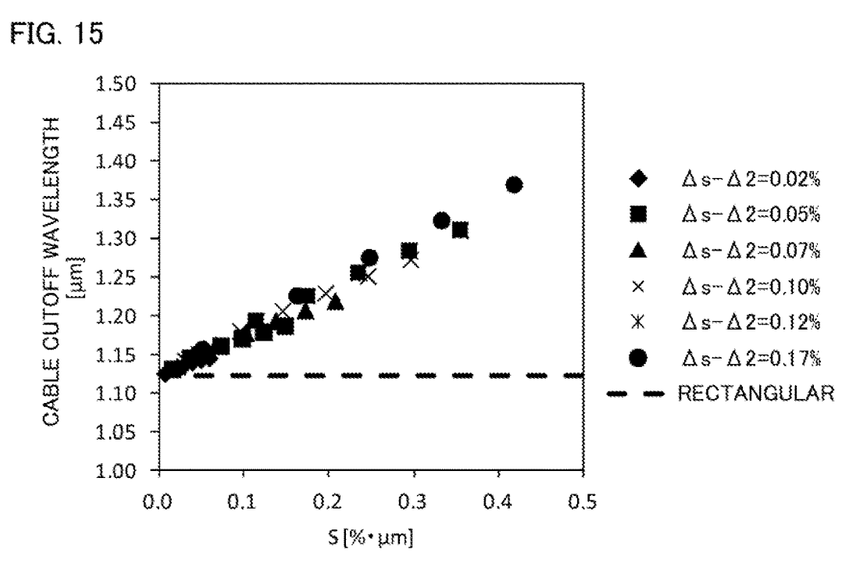
FIG. 15 is a diagram of the relationship between the relative refractive index difference area of the outer core part of the optical fiber described in FIG. 10 and cable cutoff wavelengths.

FIG. 15 is a diagram of the relationship between the relative refractive index difference area S and cable cutoff wavelengths shown in the same manner as in FIG. 7. As illustrated in FIG. 15, in the optical fiber according to the embodiment, when the relative refractive index difference area S is 0.3% μm or less, the cable cutoff wavelength can be made smaller than a wavelength of 1.30 μm, and when the relative refractive index difference area S is 0.25% μm or less, the cable cutoff wavelength can be 1.26 μm or less. Thus, similarly to the optical fiber 1 according to the first embodiment, also in the optical fiber according to the embodiment, when the relative refractive index difference area S is 0.25% μm or less, a recommendation of ITU-T G.652 can be satisfied. This result is generally matched with the relationship between the relative refractive index difference area S and cable cutoff wavelengths in the optical fiber 1 according to the first embodiment described using FIG. 7.

Figure 16:
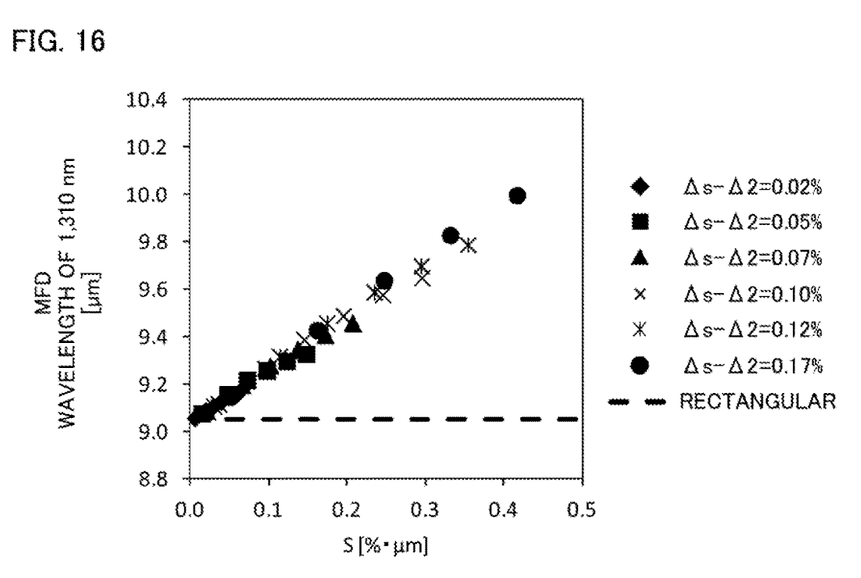
FIG. 16 is a diagram of the relationship between the relative refractive index difference area of the outer core part of the optical fiber described in FIG. 10 and the mode field diameter of light at a wavelength of 1,310 nm.

FIG. 16 is a diagram of the relationship between the relative refractive index difference area S and the mode field diameter of light at a wavelength of 1,310 nm shown in the same manner as in FIG. 8. As illustrated in FIG. 16, similarly to the optical fiber 1 according to the first embodiment, with the optical fiber of the embodiment, a decrease in the mode field diameter of light can be reduced, compared with the mode field diameter of light at a wavelength of 1,310 nm propagated through a typical communication optical fiber having a step refractive index profile. When the relative refractive index difference area S is 0.3% μm or less, the mode field diameter of light at a wavelength of 1,310 nm can be generally 9.7 μm or less, and when the relative refractive index difference area S is 0.25% μm or less, the mode field diameter of light at a wavelength of 1,310 nm can be generally 9.5 μm or less. Thus, when the relative refractive index difference area S is 0.25% μm or less, a recommendation of ITU-T G.652 can be satisfied.

Figure 17:
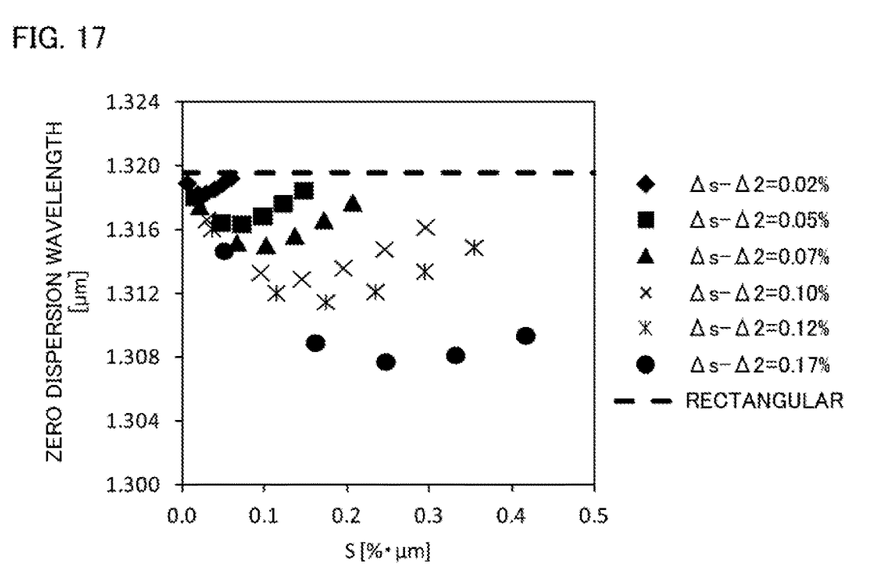
FIG. 17 is a diagram of the relationship between the relative refractive index difference area of the outer core part of the optical fiber in FIG. 10 and the zero dispersion wavelength.

FIG. 17 is a diagram of the relationship between the relative refractive index difference area of the outer core part of the optical fiber in FIG. 10 and the zero dispersion wavelength shown in the same manner as in FIG. 9. As illustrated in FIG. 17, similarly to the optical fiber 1 according to the first embodiment, also in the optical fiber according to the embodiment, it is revealed that the zero dispersion wavelength is decreased because the outer core part 12 is provided. It is revealed that the zero dispersion wavelength is decreased as the value of Δs−Δ2 is more increased, and that the relative refractive index difference area S is present in which the zero dispersion wavelength is most decreased suitable for the values of Δs−Δ2. As described above, even in the case in which the relative refractive index difference Δ2 is −0%, the zero dispersion wavelength of the optical fiber can be in a range of 1.300 to 1.324 μm, which is recommended in ITU-T G.652. As described in the first embodiment using FIG. 9, in the case in which the relative refractive index difference Δ2 is −0.02%, the zero dispersion wavelength of the optical fiber can be in a range of 1.300 to 1.324 μm. Thus, it can be thought that under the conditions in which at least the relative refractive index difference Δ2 is −0.02% or more and −0% (0%) or less, the zero dispersion wavelength of the optical fiber can be in a range of 1.300 to 1.324 Δm.

In the optical fiber according to the embodiment, the composition of the inner cladding part can be made similar to the composition of the outer cladding part. Thus, a configuration simpler than the configuration of the optical fiber 1 according to the first embodiment can be provided.

As described above, the present invention is described using the first and the second embodiments as examples. However, the present invention is not limited to these embodiments.

In the optical fiber 1 according to the first embodiment, the refractive index of the inner cladding part 21 is lower than the refractive index of the outer cladding part 22. In the optical fiber according to the second embodiment, the refractive index of the inner cladding part 21 is equal to the refractive index of the outer cladding part 22. In other words, in the optical fibers according to the present invention, the refractive index of the inner cladding part 21 is not greater than the refractive index of the outer cladding part 22. Thus, the relative refractive index difference Δ2 of the inner cladding part 21 to the outer cladding part 22 only has to be zero or less, which is not necessarily the same as that of the foregoing embodiments.

In the foregoing embodiments, the optical fiber having one core is described. However, a multicore fiber may be formed, in which pluralities of inner core parts 11, outer core parts 12, and inner cladding parts 21 according to the embodiment are provided and an outer cladding part 22 surrounds the inner cladding parts 21 with no gap.

As described above, with the optical fiber of the present invention, a decrease in the mode field diameter of light can be reduced, a complicated configuration can be avoided, and bending losses can be reduced. The optical fiber can be used in the field of optical communications.

REFERENCE SIGNS LIST

1 . . . optical fiber
10 . . . core
11 . . . inner core part
12 . . . outer core part
20 . . . cladding
21 . . . inner cladding part
22 . . . outer cladding part

The invention claimed is:

1. An optical fiber comprising:
a core; and
a cladding surrounding the core, wherein
the core includes
   an inner core part including a center axis of the core and having a refractive index that is constant in a radial direction, and
   an outer core part surrounding the inner core part,
the cladding includes
   an inner cladding part having a refractive index that is constant in the radial direction, the inner cladding part being in contact with the core, and
   an outer cladding part surrounding the inner cladding part,
a refractive index of a region of the inner core part in contact with the outer core part is higher than a refractive index of the outer core part,
the refractive index of the outer core part is gradually decreased from an inner circumferential side to an outer circumferential side, and
a refractive index of the inner cladding part is equal to a refractive index of an outermost circumferential part of the outer core part and is not greater than a refractive index of the outer cladding part,
wherein a refractive index profile in the radial direction of the entire cladding is equal to or higher than the refractive index of the outermost circumferential part of the outer core part,
wherein
when a distance from the center axis to an internal circumference of the outer core part is defined as r1, a distance from the center axis to an outer circumference of the outer core part is defined as rs,
a relative refractive index difference of the outer core part to the outer cladding part at the distance r from the center axis is defined as Δ(r), and
the relative refractive index difference of the inner cladding part to the outer cladding part is defined as Δ2,
S, which is expressed by the following Equation (1), is 0.3% μm or less, $$S=\int_{r_1}^{rs}(\Delta(r)-\Delta2)dr \quad (1)$$

2. The optical fiber according to claim 1, wherein the refractive index of the inner cladding part is smaller than the refractive index of the outer cladding part.

3. The optical fiber according to claim 2, wherein a relative refractive index difference of the inner cladding part to the outer cladding part is −0.02% or more.

4. The optical fiber according to claim 1, wherein the refractive index of the inner cladding part is equal to the refractive index of the outer cladding part.

5. The optical fiber according to claim 1, wherein the S is 0.25% μm or less.

6. The optical fiber according to claim 1, wherein the S is 0.1% μm or more.

7. The optical fiber according to claim 1, wherein the relative refractive index difference of a region of the outer core part in contact with the inner core part is 0.02% or more and 0.12% or less.

8. The optical fiber according to claim 1, wherein ratio rs/r1 is 1.7 or more.

* * * * *